(12) United States Patent
Dezonno et al.

(10) Patent No.: US 7,324,640 B2
(45) Date of Patent: *Jan. 29, 2008

(54) TRANSACTION OUTCOME STATE MAPPING

(75) Inventors: Anthony Dezonno, Bloomingdale, IL (US); Jeffrey Hodson, Wheaton, IL (US); Roger Sumner, Batavia, IL (US); Carlo Bonifazi, Woodridge, IL (US); Mark Michelson, Elburn, IL (US); Robert Beckstrom, Bolingbrook, IL (US); Mark Powers, Carol Stream, IL (US); Craig Shambaugh, Wheaton, IL (US)

(73) Assignee: Rockwell Electronic Commerce Technologies, Wood Dale, IL (US)

(*) Notice: Subject to any disclaimer, the term of this patent is extended or adjusted under 35 U.S.C. 154(b) by 1224 days.

This patent is subject to a terminal disclaimer.

(21) Appl. No.: 10/099,784

(22) Filed: Mar. 15, 2002

(65) Prior Publication Data

US 2003/0174831 A1 Sep. 18, 2003

(51) Int. Cl.
*H04M 3/00* (2006.01)
*H04M 5/00* (2006.01)
(52) U.S. Cl. .............................. 379/265.02; 379/265.01
(58) Field of Classification Search ................................
379/265.01–265.14, 266.01–266.1, 309
See application file for complete search history.

(56) References Cited

U.S. PATENT DOCUMENTS

| | | | |
|---|---|---|---|
| 5,530,744 A | 6/1996 | Charalambous et al. |
| 5,555,179 A | 9/1996 | Koyama et al. |
| 5,684,872 A | 11/1997 | Flockhart et al. |
| 5,765,033 A | 6/1998 | Miloslavsky |
| 5,832,070 A | 11/1998 | Bloom et al. |
| 5,841,854 A | 11/1998 | Schumacher et al. |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Macleod Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |

(Continued)

*Primary Examiner*—William J. Deane, Jr.
(74) *Attorney, Agent, or Firm*—Welsh & Katz, Ltd.

(57) ABSTRACT

A method and apparatus are provided for expediting subject matter evolution of an information exchange during a contact through a communication system between a client and an agent of an organization that possesses an expertise in the subject matter of the contact. The method includes the steps of providing a state map of subject matter progression of the subject matter of the contact from a starting point to subject matter resolution along a plurality of parallel subject matter paths, fitting a subject matter progression of the contact within a progression of subject matter of a most likely one of the plurality of parallel subject matter paths of the state map and prompting the agent with prospective subject matter from the most likely one of the plurality of subject matter paths.

40 Claims, 4 Drawing Sheets

U.S. PATENT DOCUMENTS

| | | |
|---|---|---|
| 6,233,332 B1 | 5/2001 | Anderson et al. |
| 6,278,777 B1 | 8/2001 | Morley et al. |
| 6,327,362 B1 | 12/2001 | Hull et al. |
| 6,345,305 B1 | 2/2002 | Beck et al. |
| 6,373,836 B1 | 4/2002 | Deryugin et al. |
| 6,377,944 B1 * | 4/2002 | Busey et al. .................. 707/3 |
| 6,389,007 B1 | 5/2002 | Shenkman et al. |
| 6,393,015 B1 | 5/2002 | Shtivelman |
| 6,732,156 B2 | 5/2004 | Miloslavsky |
| 2006/0080107 A1 * | 4/2006 | Hill et al. .................. 704/275 |

* cited by examiner

TRANSACTION OUTCOME STATE MAPPING

FIELD OF THE INVENTION

The field of the invention relates to communication systems and more particularly to information resources available through automatic call distributors.

BACKGROUND OF THE INVENTION

Call-centers are generally known. A call-center is typically used wherever a large number of calls must be handled for some common enterprise. Typically, the calls of the enterprise are routed through the call-center as a means of processing the calls under a common format.

Call-centers typically include at least three elements: an automatic call distributor (ACD), a group of agents for handling the calls, and a host computer containing customer information. The individual agents of the groups of agents are each typically provided with a telephone console and a computer terminal. The telephone terminal receives customer calls distributed to the agent by the ACD. The terminal may be used to retrieve customer records from the host.

Call-centers are typically automated in the delivery of calls to agents and in the retrieval of customer records for use by agents. Features within the PSTN such as dialed number identification service (DNIS) and automatic number identification (ANI) may be used to determine not only the destination of the call, but also the identity of the caller. DNIS and ANI information, in fact, may be delivered by the PSTN to the ACD in advance of call delivery.

Based upon the destination of the call and identity of the caller, the ACD may select the agent most qualified to service the call. By sending an identifier of the selected agent along with the identity of the caller to the host, the host may automatically retrieve and download customer records to the agent's terminal at the same instant as the call arrives.

While call-centers are effective, the skill level of agents varies considerably. To simplify and add consistency to call handling, agents are often provided with written scripts to follow during conversations with customers. While such scripts help, they may prove ineffective in the case of a customer who asks questions or otherwise does not allow the agent to follow the prepared script. Accordingly, a need exists for a way of making sales presentations that is not limited to a predetermined format.

SUMMARY

A method and apparatus are provided for expediting subject matter evolution of an information exchange during a contact through a communication system between a client and an agent of an organization that possesses an expertise in the subject matter of the contact. The method includes the steps of providing a state map of subject matter progression of the subject matter of the contact from a starting point to subject matter resolution along a plurality of parallel subject matter paths, fitting a subject matter progression of the contact within a progression of subject matter of a most likely one of the plurality of parallel subject matter paths of the state map and prompting the agent with prospective subject matter from the most likely one of the plurality of subject matter paths.

DETAILED DESCRIPTION OF AN ILLUSTRATED EMBODIMENT

Figure 1:
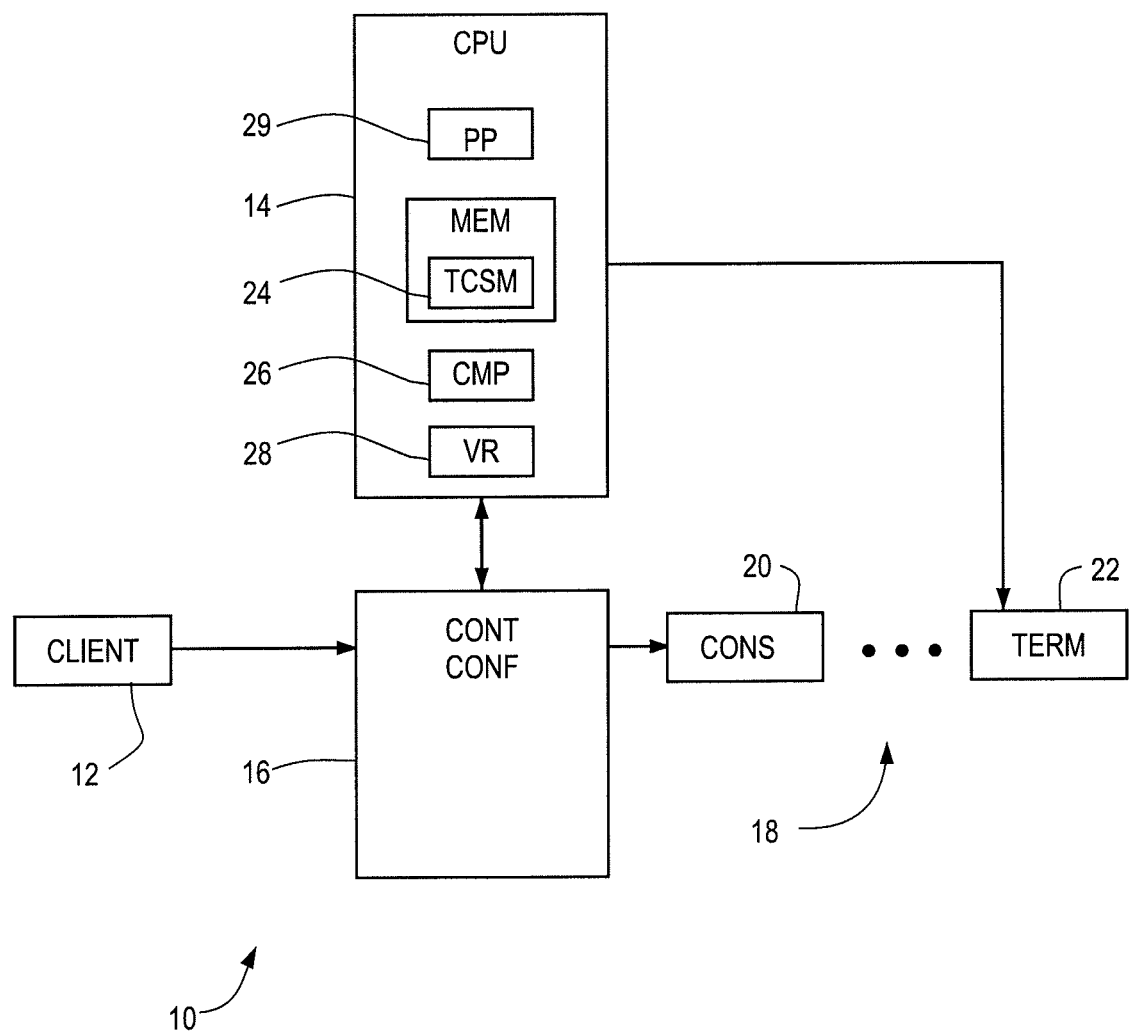
FIG. 1 is a block diagram of a system for expediting evolution of an exchange under an illustrated embodiment of the invention.

FIG. 1 is a block diagram of a system 10, shown generally, that expedites evolution of an exchange (e.g., a conversation) between a client 12 and an agent working at an agent station 18 of the system 10. Included within the system 10 may be a contact conferencing device 16 disposed between the client 12, and agent 18. The contact conferencing device 16 may function to capture exchanges from the client 12 and agent 18. Where the exchange is in the form of an audio exchange through a telephone connection, a voice recognition application 28 may be provided to convert the information content of each exchange into a form understood by the central processing unit (CPU) 14.

A comparator 26 within the CPU 14 may compare the evolution of information exchanges between the client 12 and agent 18 with the evolution of prior exchanges found within a transaction outcome state map 24. When a match is found, the agent 18 may be prompted with prospective information from the state map 24.

As used herein, the process of expediting evolution of a conversation refers to fitting an information content of the client's and agent's comments into known information paths previously recognized by the system 10 and prompting the agent to follow one or more of those paths. In the context of the system 10, a known information path means the progression of an instantaneous information content along an information path that the system 10 has recognized in prior exchanges (between the same or other agents and other clients) as leading to resolution of the subject matter of the conversation. Resolution of the conversation does not necessarily mean that the client was satisfied with the outcome of the exchange, but only that the agent has provided the client with relatively relevant information regarding the purpose of the exchange.

The known information paths recognized by the system 10 may be retrieved from the state map 24. As used herein, and in its simplest state, a state map has a known starting and ending point joined by a number of cognitive pathways. The starting and ending points may be considered as knowledge states of a client and the cognitive pathways may considered as a chain of thought facilitated by information provided by an client and agent.

The state map 24 used within the system 10 of FIG. 1 may actually include a number of different state maps, where each state map may be defined by its subject matter and purpose. The state map 24 used for any particular contact may be selected as described below.

Figure 2:
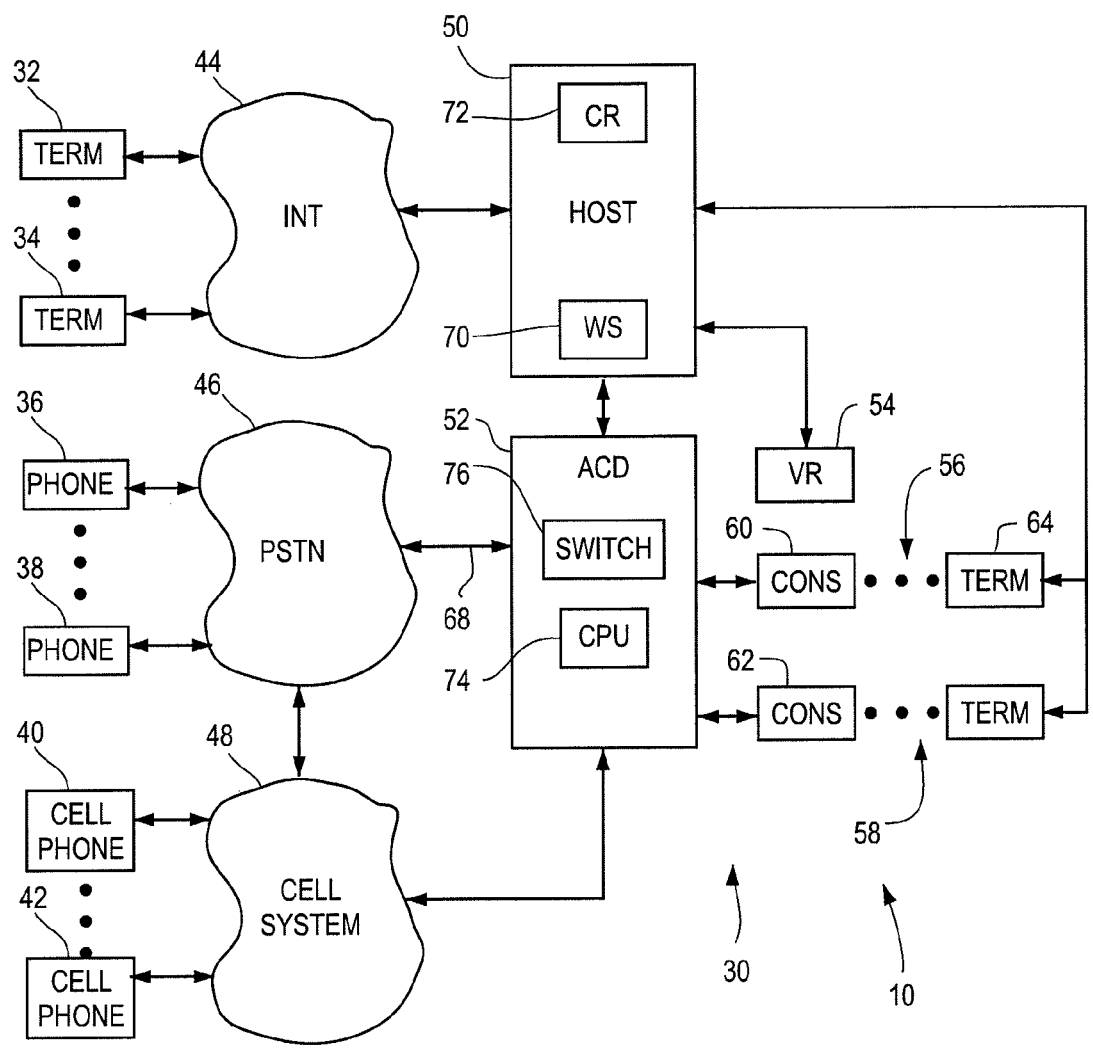
FIG. 2 depicts a context within which the system of FIG. 1 could be used.

In one illustrated embodiment of the invention, the system 10 may be used within a contact processing system 30, as shown in FIG. 2. The contact processing system 30 may be used by an organization (e.g., an environmental organization, a political organization, a merchant, etc.) to setup contacts through information exchange paths between external clients of the organization (e.g., a client using an communication device 32, 34, 36, 38, 40, 42) and agents of the organization (e.g., a selected agent working at an agent station 56, 58) for purposes of advancing the agenda of the organization.

As used herein a contact is the exchange of information between humans through a communication system (e.g., 44, 46, 48, etc.). A contact may refer to a voice conversation based upon a telephone call using a conventional switched circuit telephone connection provided through the public switched telephone network (PSTN) 46 or cellular system 48. A contact may also be a Voice-over-Internet-Protocol (VoIP) voice call, or chat session exchange established through the Internet 44.

For example, where the organization is a merchant, the contact processing system 30 may be structured around a telephone connection (e.g., a set of incoming trunk lines) 68 with the PSTN 46. The merchant may advertise its wares through television or newspaper ads. The ads may provide one or more telephone numbers associated with the telephone connection 68 of automatic call distributor (ACD) 52 of the contact center 30. If the organization has many organizational divisions (e.g., a department store), then a separate telephone number may be provided for each department.

In order to service telephone calls, the contact processing system 30 may have a number of agent stations 56, 58. Each agent station 56, 58 may be provided with a telephone console 60, 62 and a computer terminal 64, 66.

The contact processing system 30 may also function to place outgoing calls to clients. In support of outgoing calls, the contact processing system 30 may maintain a list of telephone numbers of clients 36, 38 within a set of client records 72. A host 50 may retrieve telephone numbers from the client records 72, as needed, and transfer the numbers to the automatic call distributor (ACD) 52.

The host 50 may transfer the numbers to a central processing unit (CPU) 74 within the ACD 52. The CPU 74 may monitor the activity of the agents 56, 58 and place calls to clients 36, 38 through the PSTN 46 in anticipation of agents 56, 58 becoming available.

As the CPU 74 places or receives calls, it assigns a call identifier to the call and opens a contact record for the call. If the call is an outgoing call, then the contact record would include at least the telephone number of the called party and, possibly, an identifier of the call campaign triggering the call. If the call is an incoming call, then the contact record may include call associated information. Call associated information may include ANI or DNIS information delivered from the PSTN 46 to the ACD 52 along with the call.

In the case of outgoing or incoming calls, the CPU 74 may send a contact arrival message containing the information of the contact record to the host 50. In the case of outgoing calls, the contact arrival message may be send when the called party answers and the CPU 74 determines that the call has not been answered by an answering machine. In the case of incoming calls, the contact arrival message may be sent upon detection of the call on an inbound trunk line.

Upon receiving the contact arrival message, the host 50 may retrieve customer records from a customer database 72. On outgoing calls, the telephone number of the called party may be used as an identifier of customer files. On incoming calls, ANI information may be used as the identifier.

Upon retrieving any customer records, an agent 56, 58 may be selected for handling the call. Agent selection may be accomplished by an agent selection application (not shown) operating within the host 50 or CPU 74. Agent selection may be based upon any criteria (e.g., agent skill, past customer purchases, customer preferences, objectives of an outgoing call campaign, etc.).

Once an agent is selected, the CPU 74 may instruct the switch 76 to couple the call to the telephone console 60, 62 of the selected agent 56, 58. The CPU 74 may also send a "contact routed" message to the host 50 including the call identifier and selected agent 56, 58. In response, the host 50 may deliver customer records to the terminal 64, 66 of the selected agent 56, 58 as a screen pop coincident with call delivery to the agent.

As an alternative to calls placed or received through the PSTN 46, the contact center 30 may also establish contacts through the Internet 44. A web site 70 may be provided to promulgate the objectives of the organization. Outgoing contact campaigns may be initiated by retrieving e-mail addresses of existing clients and forwarding e-mail messages containing information consistent with the objectives of the organization.

In the case of the website 70, clients may access the website 70 using a terminal 32, 34 and download one or more webpages of organizational information. If the organization is a merchant, then the webpages may provide information on one more product lines.

As clients 32, 34 access the website 70, one or more webpages may be downloaded to the client 32, 34. As the client 32, 34 browses the website 70, the host 50 may open a contact record including at least the URL of the client 32, 34 and any web pages visited.

Contained within the webpages may be one or more interactive windows or softkeys that allow information requests or direct contact with an agent 56, 58. In the case of interactive windows, the client 32, 34 may enter a particular question and his e-mail or telephone number and activate a "SUBMIT" button. Alternatively, the client 32, 34 may simply active a "TALK WITH AGENT" softkey.

In either case, the host 50 may process the activity as a contact request and process the activity accordingly. Any information entered into an interactive window may be added to the contact record.

To process the contact request, the host 50 may retrieve the contact record and determine a subject matter of the request based upon any webpages visited or questions entered through an interactive window. The host 50 may then retrieve a set of agent skills and search for and select an agent 56, 58 having the required skills. Finally, the host 50 may send the contact record to the selected agent 56, 58. In the case of a "TALK WITH AGENT" request, the host 50 may also send instructions activating an VoIP application within the agent's terminal 64, 66 and establishing VoIP contact with the requesting client 32, 34.

Figure 3:
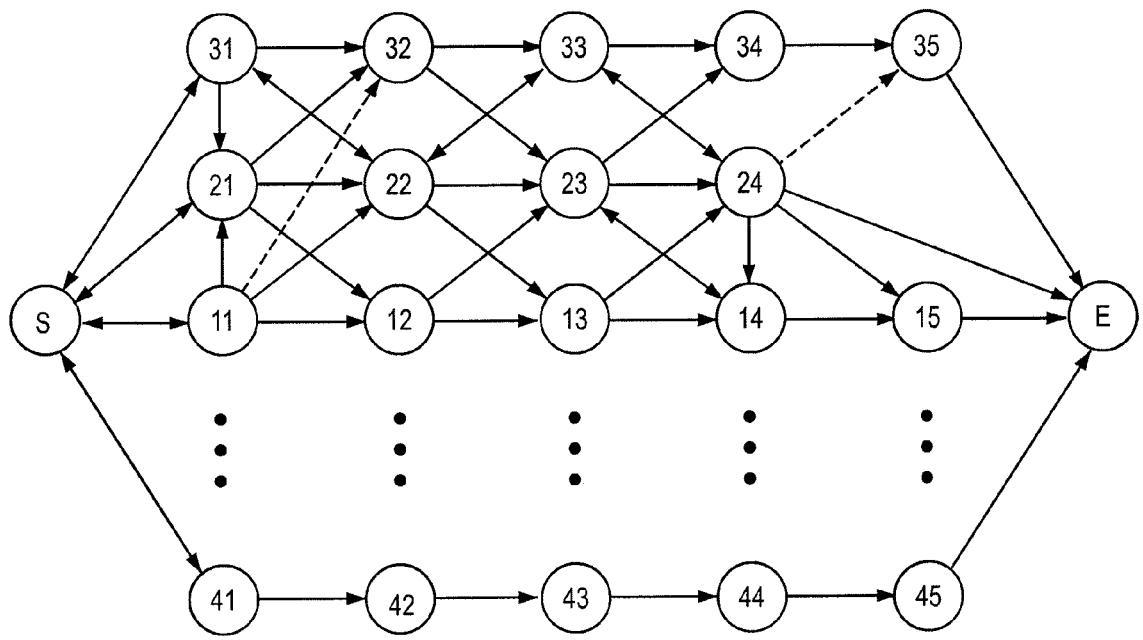
FIG. 3 depicts a transaction outcome state map that may be used by the system of FIG. 1.

Once a contact established through the Internet 44, PSTN 46 or cellular system 48 is assigned to an agent 56, 58, the simplified diagram of FIG. 1 may be used to describe the process of expediting subject matter evolution. FIG. 3 may be used to describe the state map 24 of FIG. 1.

While the state map 24 of FIG. 3 is shown as a single map having many paths, it may be assumed that there are, in fact, many state maps 24 present within the memory of the CPU 14. The CPU 14, in fact, may contain a separate state map 24 for each contact type processed by the contact processing center 30.

The circle labeled "S" (circle S) of FIG. 3 may be assumed to be the starting point for any contact. The circle labeled "E" (circle E) may be regarded as the end point. Circle S may be assumed to be the starting point for an incoming call to the contact center 30, an outgoing call under a call campaign, a chat session, email exchange or VoIP exchange.

Circle S for each state map 24 may be consider as an information element in itself that may be used for selection of a proper state map 24. The information content of circle S, in fact, may correspond to contact types identified by the host 50 for purposes of agent selection.

Further, each circle of the progression of circles joining circle S and circle E may be regarded as a separate information state in the state map 24. In effect, each circle may represent a separate knowledge state in a thought process progressing from circle S to circle E.

The information states of each circle shown in FIG. 3 may be represented in any of a number of different manners. For example, the present state of an information content of exchanges between the agent and client may be measured by a discounted key word content process. Key word combinations may be detected to identify information states. However, key word combinations may be discounted by the time period since any particular combination was last detected. The particular key word combinations and discounts applied to combinations may be used to means of mapping the logical thought processes of clients.

Figure 4:
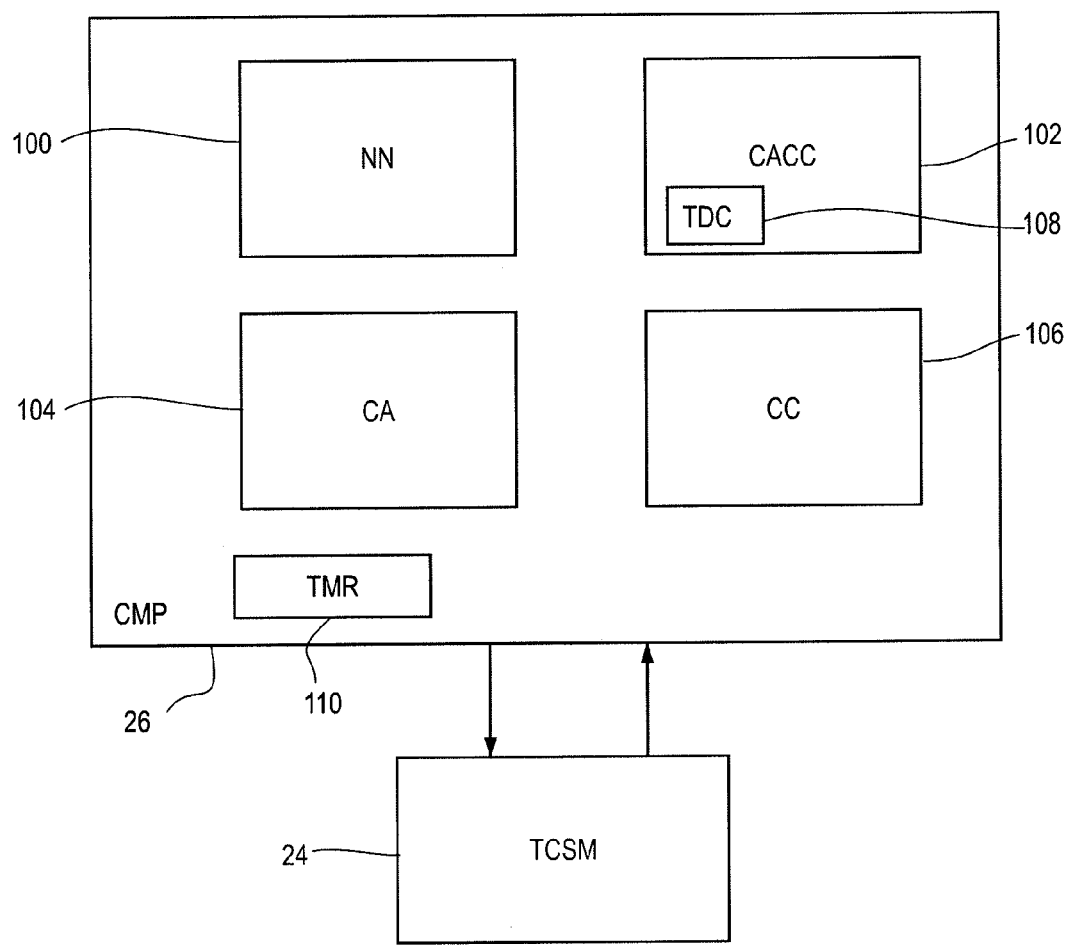
FIG. 4 depicts a comparator that may be used within the system of FIG. 1.

FIG. 4 depicts apparatus within the comparator 26 of FIG. 1 that may be used to create and match an exchange of a current contact with a path within a state map. As used herein, a current contact means a presently established exchange between a client and an agent, as opposed to prior contacts that may be used in the creation of the state maps 24.

The state maps 24 may be created under any of a number of different methodologies. Under one methodology, a neural network (NN) 100 may be used to create a state map for each contact type by comparing each of a number of prior exchanges of the contact type and identifying a set of information pathways joining the starting and end points.

Within the comparator 26 a content analyzer 104 may receive each exchange. An exchange may be defined by the passage of a predetermined time period identified by a timer 110 or by passage of control of the conversation from one party to the other. Passage of control may occur when one party ends a sentence and the other party begins speaking. Alternatively, in the case of e-mail or chat sessions, passage of control occurs when one party transmits a message and begins waiting for a response.

In either case, the content analyzer 104 may retrieve key words from each exchange. The key words from the exchange may together form a content element. The content element may be given a time stamp from the timer 110.

Once key words of the content element are collected from each exchange, they may be transferred to a content accumulator (CACC) 102. Within the CACC 102, the content element may be added to (i.e., concatenated with) other content elements of the same contact between client and agent. Together the contact elements form a contact path. An end of the contact path is identified when the exchanges cease. Detection of the end of the exchanges may be provided in FIG. 2 by detection by the CPU 74 that one party or the other has hung up. Alternatively, for contacts through the Internet 44, the end of an exchange may be identified by the passage of a predetermined time period.

At the end of an exchange, the content analyzer 104 may attempt to determine whether there has been a subject matter resolution. If there has been resolution, then history of the contact may be used by the NN 100 to enhance the state map 24. If not, then the history may be discarded.

Subject matter resolution may be identified in by any number of methods. If the organization is a political or environmental organization doing fund raising, then identification of subject matter resolution may be identified by entry of contribution information (e.g., a credit card number, name and address for sending a bill, etc.) through the terminal 22 of the agent 18 confirming that the client 12 has made a contribution. In the case of a merchant, subject matter resolution may be identified by entry of an order by the agent 18 through the terminal.

Alternatively, subject matter resolution may also be determined by a comparison of key words. For example, an information content of an agent's words may be compared with an information content of the client's words during a predetermined period proximate the end of the exchange. The information content of the agent's words may be compared with the information content of the client's words. If the difference does not exceed a threshold value, then a determination may be made that there has been subject matter resolution.

As a further alternative, voice stress analysis and pause measurements may be performed proximate the end of the call of identify subject matter resolution. Under this mode of measurement, pauses may indicate that the client has no further questions and has reached an understanding with the agent. Comparing a measured voice stress and pause durations with appropriate threshold values may provide further indication that a client has been satisfied with the results of the conversation.

Once subject matter resolution has been confirmed, the NN 100 may attempt to fit the contact history into the state diagram 24 of FIG. 3. Fitting the contact history into the state diagram 24 may mean performing cross-correlation analysis between portions of the call history and portions of the state diagram.

For example, to create the state diagram 24, the NN 100 may form a database of contact histories. Over time, the NN 100 may identify groups of contact histories for each contact type that substantially follow a predetermined path (e.g., path S to 11 to 12 to 13 to 14 to 15 to E). Where the number of incidences of repetitive tracking along the same path exceeds some threshold value, the NN 100 may create the first path of FIG. 3 (i.e., path S to 11 to 12 to 13 to 14 to 15 to E). After a period of time, the NN 100 may also cross-correlate contact histories to identify another path that exceeds the threshold value (e.g., path S to 21 to 12 to 13 to 14 to 15 to E). In this case, the NN 100 may add information element 21 to the state map 24.

Using the above process, the NN 100 may continue to build and modify the state map 24 to arrive at a structure such as that depicted in FIG. 3. Further, because of the dynamic nature of the use of the NN 100, the state map 24 may change based upon demographics, client knowledge and client base.

Once the state map 24 has been created, it may be used to expedite subject matter evolution of an exchange. As contacts are established, a state map 24 and agent may be selected based upon the content of the contact record. Each exchange may be analyzed and content elements collected by the content analyzer 104 (as discussed above with regard to the NN 100). Content elements may be time stamped to establish a content element sequence and placed into a contact history within the CACC 102, with a current contact element defined as the most recent contact element. A cross-correlation (CC) processor 106 may be used to cross-correlate (fit) the portion of the contact history with existing paths within the state record 24. Where a contact sequence of a current contact substantially matches a portion of an existing path (i.e., the fit is successful in identifying a path that is the most likely path of the number of paths in the state map 24), a prompting processor (PP) 29 may retrieve prospective information from the path and prompt the agent 18 with the prospective information.

For example, if the exchange of a current contact between client 12 and agent 18 results in a fitting of content elements to circle sequence S, 11, 22, 13 of FIG. 3, then the PP 29 may prompt the agent 18 with prospective information elements 14, 24. In this example, the state map 24 of FIG. 3 shows that if the most recent exchange of the contact history leads to circle 13, then the prospective information content of the exchange should proceed to circles 14 and 24 from circle 13.

Prompting of the agent may occur under any of a number of different formats. For example, descriptive information associated with circles 14 and 24 may be displayed on the terminal 22 of the agent 18. Alternatively, an audible prompt may be provided through an earphone of the agent 18, that is heard only by the agent 18.

In order to facilitate evolution of the conversation, the PP 29 may display a portion of the state map 24 on the terminal of the agent 18 as a set of connected information elements with descriptive information displayed within each element. The present state of the exchange (circle 13 of this example) within the matched portion may be indicated by causing a border of the element to flash. Where more than one possible path diverge from the last exchange, as here to circles 14 or 24, then the agent 18 may choose one over the other by placing a cursor over the choice (e.g., the element corresponding to circle 24) and activating a switch on a mouse. Selection of one circle over another, in effect, allows the agent 18, in effect, to temporarily seize control of evolution of the conversation.

The display of the portion of the state map 24 serves the important function of allowing the agent to select options and thereby evolve the conversation based upon intuition. In response, more detailed prompts may be provided to the agent 18 detailing the information content of circle 24.

It should be noted in this regard, that selection of any one element of the state map 24 simply causes the PP 29 to present prompts associated with the selected circle. It does not immediately cause the matching of the contact element sequence with the state map 24 to change.

The agent 18 may respond to the prompts associated with the selected circle 24 and continue to exchange information with the client 12. During the exchange, the content analyzer 104 continues to collect key words of content elements. It should be noted in this case, that even though the agent 18 may have selected circle 24 and begin presenting information associated with circle 24, the content of the exchange may still proceed to circle 14. The content of the exchange may proceed to circle 14 under either of two possible scenarios. In a first scenario, the client 12 may ask questions or make comments that contain key words more closely associated with circle 14 than circle 24. In this case, the contact history may more closely fit a progression from circle 13 to circle 14, even though the agent 18 has lead the client in another direction. In this case, the CC processor 106 may detect the shift in information content and begin prompting the agent 18 with information associated with circle 14.

In a second scenario, after presenting the content of circle 24, the agent 18 may choose to proceed to the information of circle 14 by selecting circle 14 on his terminal 22. The agent 18 may choose to proceed to the information content of circle 14 because of prior familiarity with the client 12 or because he senses that the client 12 wants to receive the information of circle 14. In either case, the system 10 follows the exchange based upon the content.

Further, fitting of contact elements need not extend all the way back to the beginning of the state map 24. For example, cognitive inferencing may be used to match or otherwise fit portions of a content element sequence to a portion of the state map 24. Where the length of the match exceed some threshold value an inference may be made with sufficient reliability to expedite evolution of the information exchange.

A specific embodiment of a method and apparatus for expediting subject matter evolution of an information exchange has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of expediting subject matter evolution of an information exchange during a contact through a communication system between a client and an agent of an organization that possesses an expertise in the subject matter of the contact, such method comprising the steps of:
   providing a state map of subject matter progression of the subject matter of the contact from a starting point to subject matter resolution along a plurality of subject matter paths joining the starting point and at least one common subject matter resolution point;
   fitting a subject matter progression of the contact within a progression of subject matter of a most likely one of the plurality of subject matter paths of the state map; and
   prompting the agent with prospective subject matter from the most likely one of the plurality of subject matter paths.

2. The method of expediting subject matter evolution as in claim 1 further comprising retrieving a contact record as the starting point of the information exchange.

3. The method of expediting subject matter evolution as in claim 2 further comprising selecting the provided state map from a plurality of state maps based upon a content of the retrieved contact record.

4. The method of expediting subject matter evolution as in claim 1 wherein the step of providing a state map further comprises analyzing a plurality of prior exchanges with other clients.

5. The method of expediting subject matter evolution as in claim 4 wherein the step of analyzing the plurality of prior conversations with other callers further comprises recognizing an information content of the prior exchanges.

6. The method of expediting subject matter evolution as in claim 5 wherein the step of recognizing an information content further comprises recognizing voice information exchanged between the client and the agent.

7. The method of expediting subject matter evolution as in claim 5 wherein the step of recognizing an information content further comprises recognizing an information content of e-mails exchanged between the client and the agent.

8. The method of expediting subject matter evolution as in claim 1 wherein subject matter resolution further comprises reaching an agreement between the client and the agent.

9. The method of expediting subject matter evolution as in claim 8 wherein the agreement between the client and the agent further comprises purchasing a product from the organization.

10. The method of expediting subject matter evolution as in claim 8 wherein the agreement between the client and the agent further comprises promising to contribute to the organization.

11. The method of expediting subject matter evolution as in claim 8 wherein the step of reaching the agreement further comprises measuring a subject matter difference between express comments of the client and the agent.

12. The method of expediting subject matter evolution as in claim 11 wherein the step of measuring a subject matter difference between express comments of the client and the agent further comprises comparing the measured difference with a threshold value.

13. The method of expediting subject matter evolution as in claim 1 wherein the step of providing a database of progressive subject matter content of prior contacts further comprises determining a subject matter content of prior exchanges after each contribution from the client and the agent.

14. The method of expediting subject matter evolution as in claim 1 wherein the step of fitting a progression of the subject matter of the current contact with a most likely one of the plurality of the prior contacts further comprises determining a subject matter content of the current exchange after each contribution from the client and the agent.

15. The method of expediting subject matter evolution as in claim 1 wherein the step of fitting a progression of the subject matter of the current contact with a most likely one of the plurality of the prior contacts further comprises cross-correlating the determined subject matter of the current exchange with the subject matter of prior exchanges.

16. The method of expediting subject matter evolution as in claim 1 wherein the step of prompting the agent further comprises presenting a contact flow path including suggested subject matter to be presented to the client.

17. The method of expediting subject matter evolution as in claim 1 wherein the step of prompting the agent further comprises presenting an audible suggestion into an earphone of the agent of subject matter to be presented to the client.

18. The method of expediting subject matter evolution as in claim 1 wherein the step of prompting the agent further comprises presenting information elements on a terminal of the agent for presentation to the client.

19. An apparatus for expediting subject matter evolution of an information exchange during a contact through a communication system between a client and an agent of an organization that possesses an expertise in the subject matter of the contact, such apparatus comprising:

means for providing a state map of subject matter progression of the subject matter of the contact from a starting point to a common subject matter resolution point along a plurality of subject matter paths joining the starting point to the subject matter resolution point;

means for fitting a subject matter progression of the contact within a progression of subject matter of a most likely one of the plurality of subject matter paths of the state map; and means for prompting the agent with prospective subject matter from the most likely one of the plurality of subject matter paths.

20. The apparatus for expediting subject matter evolution as in claim 19 further comprising means for retrieving a contact record as the starting point of the information exchange.

21. The apparatus for expediting subject matter evolution as in claim 20 further comprising means for selecting the provided state map from a plurality of state maps based upon a content of the retrieved contact record.

22. The apparatus for expediting subject matter evolution as in claim 19 wherein the means for providing a state map further comprises means for analyzing a plurality of prior exchanges with other clients.

23. The apparatus for expediting subject matter evolution as in claim 22 wherein the means for analyzing the plurality of prior conversations with other callers further comprises means for recognizing an information content of the prior exchanges.

24. The apparatus for expediting subject matter evolution as in claim 23 wherein the means for recognizing an information content further comprises means for recognizing voice information exchanged between the client and the agent.

25. The apparatus for expediting subject matter evolution as in claim 23 wherein the means for recognizing an information content further comprises means for recognizing an information content of e-mails exchanged between the client and the agent.

26. The apparatus for expediting subject matter evolution as in claim 19 wherein subject matter resolution further comprises means for reaching an agreement between the client and the agent.

27. The apparatus for expediting subject matter evolution as in claim 26 wherein the agreement between the client and the agent further comprises means for purchasing a product from the organization.

28. The apparatus for expediting subject matter evolution as in claim 26 wherein the agreement between the client and the agent further comprises means for promising to contribute to the organization.

29. The apparatus for expediting subject matter evolution as in claim 26 wherein the means for reaching the agreement further comprises means for measuring a subject matter difference between express comments of the client and the agent.

30. The apparatus for expediting subject matter evolution as in claim 29 wherein the means for measuring a subject matter difference between express comments of the client and the agent further comprises means for comparing the measured difference with a threshold value.

31. The apparatus for expediting subject matter evolution as in claim 19 wherein the means for providing a database of progressive subject matter content of prior contacts further comprises means for determining a subject matter content of prior exchanges after each contribution from the client and the agent.

32. The apparatus for expediting subject matter evolution as in claim 19 wherein the means for fitting a progression of the subject matter of the current contact with a most likely one of the plurality of the prior contacts further comprises means for determining a subject matter content of the current exchange after each contribution from the client and the agent.

33. The apparatus for expediting subject matter evolution as in claim 19 wherein the means for fitting a progression of the subject matter of the current contact with a most likely one of the plurality of the prior contacts further comprises means for cross-correlating the determined subject matter of the current exchange with the subject matter of prior exchanges.

34. The apparatus for expediting subject matter evolution as in claim 19 wherein the means for prompting the agent further comprises means for presenting a contact flow path including suggested subject matter to be presented to the client.

35. The apparatus for expediting subject matter evolution as in claim 19 wherein the means for prompting the agent further comprises means for presenting an audible suggestion into an earphone of the agent of subject matter to be presented to the client.

36. The apparatus for expediting subject matter evolution as in claim 19 wherein the means for prompting the agent further comprises means for presenting information elements on a terminal of the agent for presentation to the client.

37. An apparatus for expediting subject matter evolution of an information exchange during a contact through a communication system between a client and an agent of an organization that possesses an expertise in the subject matter of the contact, such apparatus comprising:
- a state map adapted to provide subject matter progression of the subject matter of the contact from a starting point to subject matter resolution along a plurality of subject matter paths joining the starting point to at least one common end point;
- a cross-correlation processor adapted to fit a subject matter progression of the contact within a progression of subject matter of a most likely one of the plurality of subject matter paths of the state map; and
- a prompting processor adapted to prompt the agent with prospective subject matter from the most likely one of the plurality of subject matter paths.

38. The apparatus for expediting subject matter evolution as in claim 37 further comprising a contact record adapted to provide the starting point of the information exchange.

39. The apparatus for expediting subject matter evolution as in claim 38 further comprising a plurality of state maps adapted to be selected as the state map based upon a content of the retrieved contact record.

40. A method of expediting subject matter evolution of an exchange during a current contact between a client and an agent of an organization that possesses an expertise in the subject matter of the contact, such method comprising the steps of:
- analyzing a plurality of prior exchanges with other clients;
- dividing the analyzed prior exchanges into a plurality of contact types based upon subject matter resolution;
- forming a database of progressive subject matter content of prior contacts along a plurality of subject matter paths leading to a common subject matter resolution for each of the contact types;
- fitting a progression of the subject matter of the current contact with a progression of subject matter of a most likely one of the plurality of the prior contacts; and
- prompting the agent with prospective subject matter from the most likely one of the prior contacts.

* * * * *